United States Patent
Bensilum

(10) Patent No.: US 8,622,340 B2
(45) Date of Patent: Jan. 7, 2014

(54) AIR INLET OF AN AEROENGINE HAVING UNDUCTED PUSHER PROPELLERS

(75) Inventor: Stephane Emmanuel Daniel Bensilum, Alfortville (FR)

(73) Assignee: SNECMA, Paris (FR)

( * ) Notice: Subject to any disclaimer, the term of this patent is extended or adjusted under 35 U.S.C. 154(b) by 304 days.

(21) Appl. No.: 13/128,259

(22) PCT Filed: Nov. 9, 2009

(86) PCT No.: PCT/FR2009/001295
§ 371 (c)(1),
(2), (4) Date: May 9, 2011

(87) PCT Pub. No.: WO2010/055224
PCT Pub. Date: May 20, 2010

(65) Prior Publication Data
US 2011/0220217 A1      Sep. 15, 2011

(30) Foreign Application Priority Data
Nov. 14, 2008   (FR) ...................................... 08 06381

(51) Int. Cl.
F02C 7/042       (2006.01)
(52) U.S. Cl.
CPC ..................................... F02C 7/042 (2013.01)
USPC ....................................... 244/53 B; 137/15.1
(58) Field of Classification Search
USPC .............................. 244/53 R, 53 B; 137/15.1
See application file for complete search history.

(56) References Cited

U.S. PATENT DOCUMENTS

| | | | |
|---|---|---|---|
| 3,765,623 A * | 10/1973 | Donelson et al. ........... | 244/53 B |
| 3,946,830 A | 3/1976 | Kutney et al. | |
| 4,953,812 A | 9/1990 | Van Der Hoeven | |
| 5,156,353 A * | 10/1992 | Gliebe et al. .................... | 244/54 |
| 5,743,488 A * | 4/1998 | Rolston et al. .............. | 244/53 B |
| 5,915,403 A * | 6/1999 | McConachie et al. ....... | 137/15.1 |
| 6,129,309 A * | 10/2000 | Smith et al. ................. | 244/53 B |
| 7,086,219 B2 * | 8/2006 | Stretton et al. ............... | 60/226.1 |
| 2007/0176052 A1 | 8/2007 | Chanez et al. | |
| 2008/0258005 A1 | 10/2008 | Gall et al. | |

FOREIGN PATENT DOCUMENTS

FR         2 892 705         5/2007

OTHER PUBLICATIONS

International Search Report issued Mar. 10, 2010 in PCT/FR09/001295 filed Nov. 9, 2009.

* cited by examiner

Primary Examiner — Rob Swiatek
(74) Attorney, Agent, or Firm — Oblon, Spivak, McClelland, Maier & Neustadt, L.L.P.

(57) ABSTRACT

An air intake for an aeroplane engine of type with unducted propellers, which intake can be connected by a pylon to a fuselage of an aeroplane, a local length of the air intake, measured parallel to the axis of the engine between a point on a leading edge of the air intake and a transverse plane situated at an inlet impeller of the engine compressor, is longer in a region of the air intake connected to the pylon and shorter in a region of the air intake opposite the pylon.

10 Claims, 4 Drawing Sheets

AIR INLET OF AN AEROENGINE HAVING UNDUCTED PUSHER PROPELLERS

BACKGROUND OF THE INVENTION

1. Field of the Invention

The present invention relates to an air inlet of an aeroengine, and in particular an aeroengine having unducted pusher propellers (also known as an "open-rotor pusher" or a "pusher unducted fan").

2. Description of the Related Art

An engine of that type has two contrarotating turbines, each of which is constrained to rotate with a propeller that is situated outside the nacelle of the engine, the two propellers being arranged on a common axis one behind the other at the downstream end of the engine.

The engine is connected to an airplane via a pylon that extends substantially radially relative to the longitudinal axis of the engine and that has its radially inner end connected to the upstream end of the nacelle of the engine, i.e. to the air inlet of the engine.

The pylon must be at a sufficient axial distance from the propellers and from the upstream end or leading edge of the air inlet, in particular for aerodynamic reasons. In the prior art, it is necessary to lengthen the air inlet of the engine in the axial direction in order to enable the pylon to be connected to the air inlet and to the engine, and that gives rise to a significant increase in the weight of the nacelle and in the drag it generates in operation.

In the prior art, the air inlet of an engine having unducted pusher propellers is generally axisymmetric, i.e. its leading edge lies in a plane perpendicular to the axis of the engine. An axisymmetric air inlet has a ratio L/D that is constant all around its circumference, where L is the local length of the air inlet measured parallel to the axis of the engine between a point of the leading edge and a plane located at the upstream rotor of the engine, and where D is the inside diameter of the air inlet, at the position of said upstream rotor.

When the air inlet is not axisymmetric, its leading edge defines a surface that is approximately plane and that is referred to as a "capture" section (also known as a "hilite" or "high light"). That type of air inlet has a defined overall air inlet length that is equal to the distance between the transverse plane at the upstream rotor of the engine and the point of intersection between the capture plane of the air inlet and the axis of the engine.

For example, aeroengine air inlets are known that are of a chamfered (or "scarfed") type in which the capture plane presents a marked angle of inclination relative to the longitudinal axis of the engine, the bottom portion of the air inlet projecting axially upstream relative to its top portion. An air inlet of that type is defined by a "global" L/D ratio (global length divided by diameter) and it presents a "local" L/D ratio (local length divided by diameter) that varies linearly around the circumference of the air inlet.

That particular chamfered shape for the air inlet serves essentially to limit the noise emitted upstream by the engine towards the ground. The longer bottom portion of the chamfered air inlet serves to reflect and deflect upwards a large fraction of the noise that is emitted upstream by the engine while it is in operation. That type of engine is generally connected under the wing of an airplane by means of a pylon that is connected to the air inlet via its shorter top portion.

BRIEF SUMMARY OF THE INVENTION

A particular object of the invention is to propose a solution that is simple, effective, and inexpensive, to the above-mentioned problems associated with incorporating a pylon with the air inlet of an aeroengine having unducted pusher propellers.

To this end, the invention proposes an air inlet of an aeroengine of the type having unducted pusher propellers, the engine being for connection via a pylon to the fuselage of an airplane, the air inlet being characterized in that the local length of the air inlet, measured parallel to the axis of the engine between a point of the leading edge of the air inlet and a transverse plane situated level with an upstream rotor of the compressor of the engine, is longer in the zone of the air inlet that is connected to the pylon, and shorter in the zone of the air inlet opposite from the pylon.

The local length of the air inlet of the invention varies around the circumference of the air inlet, being at a maximum in the zone connected to the pylon, and at a minimum in the opposite zone, unlike the prior art in which the shorter top portion of the chamfered air inlet is connected to the connection pylon. The shape and the dimensions of the air inlet zone connected to the pylon are optimized as a function of dimensioning the pylon, whereas the shape and the dimensions of the remainder of the air inlet are optimized independently of the pylon so as to limit the weight of the air inlet and the drag generated by the engine nacelle in operation.

The variation in the local length of the air inlet is non-linear around the circumference of the air inlet. Unlike the prior art, the capture section of the air inlet is not plane, and it is not possible to define the length of the air inlet of the invention by means of a "global" L/D ratio.

The "local" L/D ratio of the air inlet of the invention preferably lies in the range approximately 2.5 to 0.9 between the zone connected to the pylon and the opposite zone of the air inlet, where L is the local length of the air inlet, and D is its inside diameter, L and D being measured as described above.

Advantageously, in a direction perpendicular to a midplane containing the axis of the pylon and the axis of the engine, the leading edge of the air inlet has an outline that is substantially in the form of a dihedral. By way of example, the angle at the apex of the dihedral lies in the range approximately 90° to 175°. The apex of the dihedral may present a concave rounded shape beside the opening of the dihedral. The sides of the dihedral may be substantially rectilinear, or they may be curved, being concave or convex.

Preferably, the air inlet is symmetrical relative to a midplane containing the axis of the pylon and the axis of the engine. The leading edge of the air inlet of the invention then defines two dihedrals situated on either side of that midplane and connected to each other via rounded portions.

The upstream sides of those two dihedrals lie in a first air inlet plane that is inclined relative to the axis of the engine, and the downstream sides of the dihedrals lie in a second air inlet plane that is inclined at a larger angle relative to the axis of the engine. Those two planes intersect, with the line of intersection between those two planes passing substantially through the apexes of the dihedrals. The air inlet of the invention is thus defined by two air inlet planes, unlike the single air inlet plane in the prior art.

In another aspect of the invention, the air inlet includes an axial projection, the pylon being designed to extend substantially axially and radially relative to the axis of the engine from said projection of the air inlet. The shape and the dimensions of this projection are determined as a function of the shape and the dimensions of the pylon. This projection may also be used for installing other bulky pieces of equipment of the engine.

The leading edge and/or the trailing edge of the pylon may be inclined at an angle lying in the range approximately 10° to 35° relative to a transverse plane.

The invention also provides an aeroengine having unducted pusher propellers, the engine including an air inlet as defined above.

Finally, the engine also provides an airplane, characterized in that it has two or more engines of the above-described type, the engines being connected to the rear of the airplane fuselage by means of pylons, on either side thereof. When the airplane has two engines, the connection pylon of each engine is preferably inclined at an angle lying in the range 5° to 45°, and for example at about 20°, relative to a horizontal plane passing substantially through the end of the pylon that is connected to the fuselage. When the airplane has an additional engine, the pylon connecting that engine may lie in a plane that is substantially vertical. The third engine may be situated above the airplane fuselage.

BRIEF DESCRIPTION OF THE SEVERAL VIEWS OF THE DRAWINGS

The invention can be better understood and other details, characteristics, and advantages of the present invention appear more clearly on reading the following description that is given by way of non-limiting example and with reference to the accompanying drawings, in which.

DETAILED DESCRIPTION OF THE INVENTION

Figure 1:
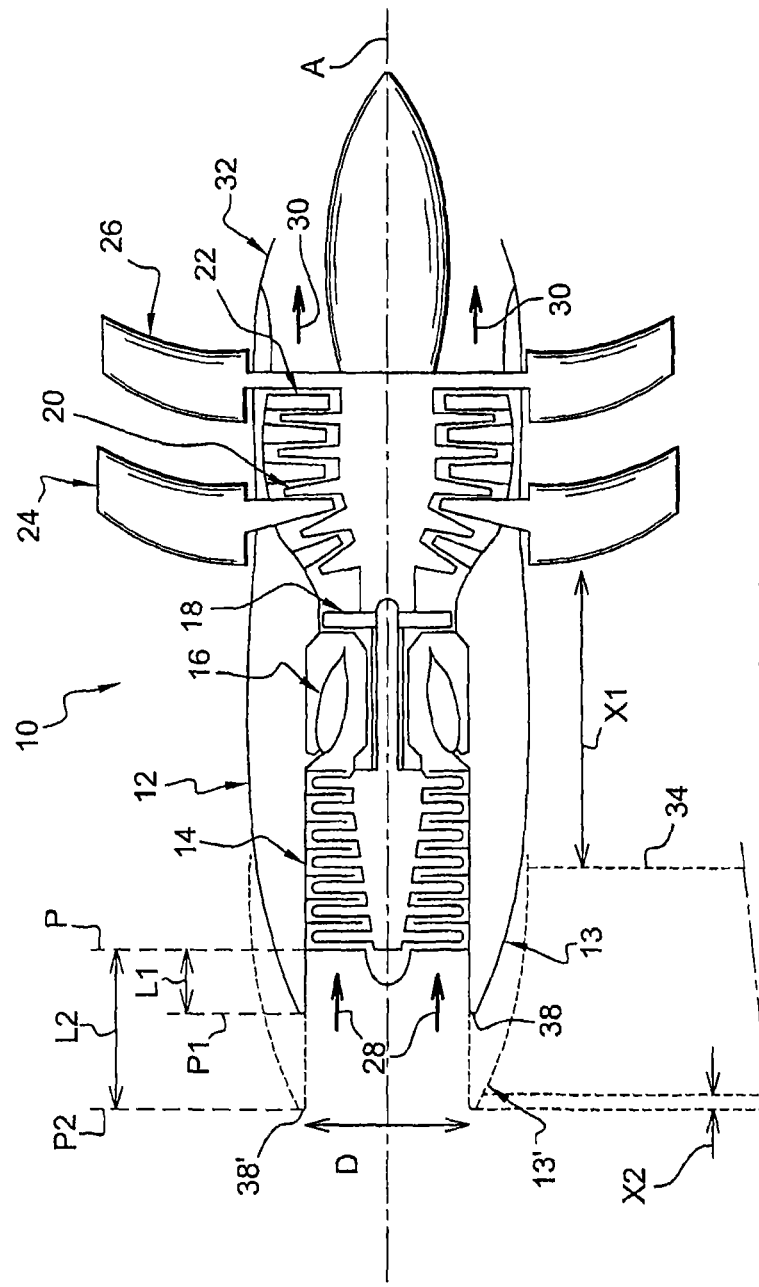
FIG. 1 is a diagrammatic axial section view of an engine having unducted pusher propellers.
Figure 2:
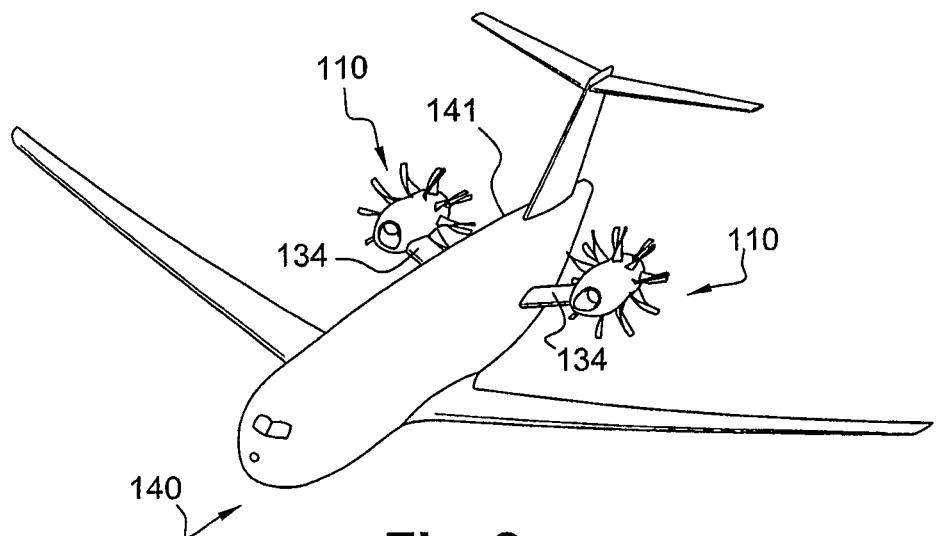
FIG. 2 is a diagrammatic perspective view of an airplane fitted with two engines of the invention having unducted pusher propellers.
Figure 3:
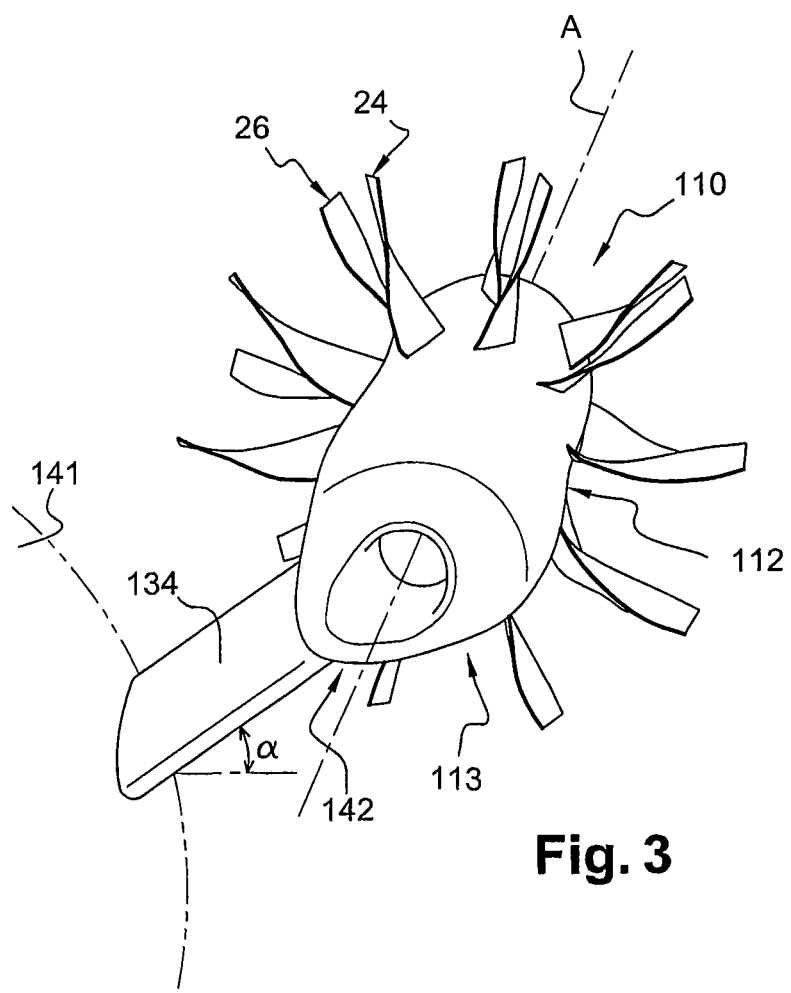
FIG. 3 is a view on a larger scale of one of the engines of FIG. 2.
Figure 4:
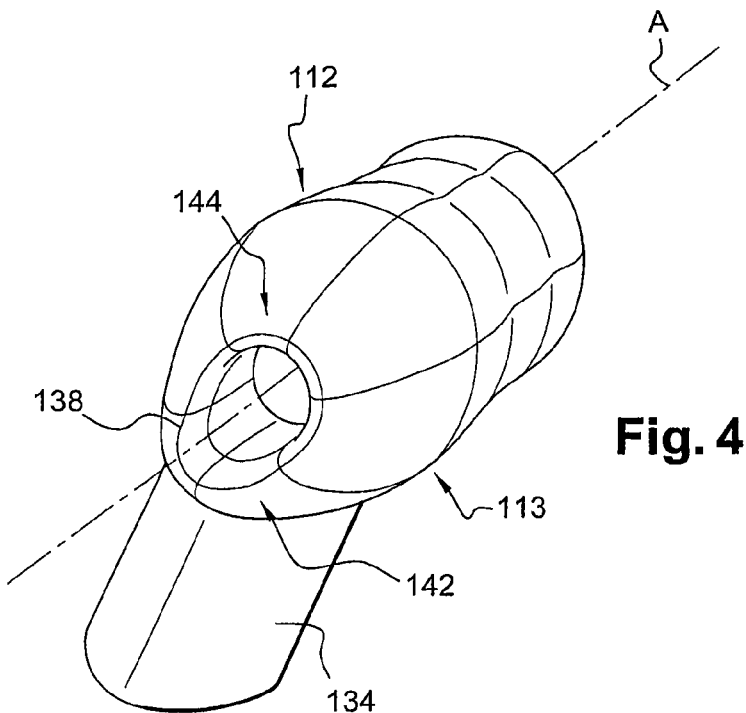
FIG. 4 is a diagrammatic perspective view of the nacelle and of the pylon of the FIG. 3 engine.

Reference is made initially to FIG. 1, which shows an aeroengine 10 having unducted pusher fans, the engine 10 comprising a turbomachine surrounded by a substantially axisymmetric nacelle 12 having an upstream end that forms an air inlet 13.

From upstream to downstream in the flow direction of gas through the engine, the turbomachine comprises a compressor 14, a combustion chamber 16, an upstream high pressure turbine 18, and two contrarotating low-pressure downstream turbines 20 and 22, i.e. turbines that rotate in opposite directions about the longitudinal axis A of the engine.

Each downstream turbine 20, 22 is constrained to rotate with an external propeller 24, 26 that extends substantially radially outside the nacelle 12.

The air stream 28 that penetrates into the air inlet 13 passes through the compressor 14 where it is compressed, and is then mixed with fuel and burnt in the combustion chamber 16, with the combustion gas then being injected into the turbines in order to drive the propellers 26, 28 in rotation, which propellers provide the major fraction of the thrust from the engine. The combustion gas 30 leaving the turbines 20, 22 is then ejected through a downstream nozzle 32 in order to increase the thrust from the engine.

The propellers 24, 26 are situated in the vicinity of the downstream end of the engine and they are said to be pusher or propulsion propellers as opposed to external propellers situated upstream from the engine that would then be said to be puller propellers.

This type of engine is connected to a portion of an airplane, such as its fuselage, by means of a pylon 34, which pylon extends substantially radially relative to the axis A, outside the nacelle 12, and needs to be at an axial distance X1 that is sufficient from the leading edges of the blades of the upstream propeller 24 and at an axial distance X2 that is sufficient from the leading edge 38 of the air inlet, in particular for aerodynamic reasons. It has therefore been necessary in the prior art to lengthen the air inlet 13 axially in order to enable the pylon 34 of the engine to be incorporated.

In the example of FIG. 1, the air inlet 13 drawn in continuous lines presents an optimum minimum length in particular for channeling air to the compressor 16, while the air inlet 13' drawn in discontinuous lines has been lengthened so as to allow the pylon 34 to be incorporated with the engine 10. Nevertheless, lengthening the air inlet significantly increases the weight of the engine and the drag it generates in flight.

The air inlet 13 of the engine is profiled, and its upstream end or leading edge 38 that engages the air presents a section of convex rounded shape.

An air inlet of an aeroengine may be defined in particular by a "local" L/D ratio, which in the example shown is constant over the entire circumference of the air inlet. D is the inside diameter of the air inlet 13 measured level with the first rotor or upstream rotor of the compressor 14, and L is the local length of said air inlet measured parallel to the axis A between a point of the leading edge 38 and a transverse plane P situated level with the upstream rotor of the compressor 14. In this example the air inlet 13 is axisymmetric and all of the points of the leading edge 38 are situated in the same transverse plane P1 (or P2 for the air inlet 13' having a leading edge 38'), referred to as its capture plane or section.

An air inlet of an aeroengine may be defined in particular by a "local" L/D ratio, which in the example shown is constant over the entire circumference of the air inlet. D is the inside diameter of the air inlet 13 measured level with the first rotor or upstream rotor of the compressor 14, and L is the local length of said air inlet measured parallel to the axis A between a point of the leading edge 38 and a transverse plane P situated level with the upstream rotor of the compressor 14. In this example the air inlet 13 is axisymmetric and all of the points of the leading edge 38 are situated in the same transverse plane P1 (or P2 for the air inlet 13'), referred to as its capture plane or section.

The air inlet 13 drawn in continuous lines has a length L1 (measured between P and P1) and it is defined by the ratio L1/D, and the air inlet 13' drawn in discontinuous lines has a length L2 (measured between P and P2) and it is defined by the ratio L2/D.

The invention makes it possible to remedy the above-mentioned problems associated with lengthening the air inlet of the engine by means of an air inlet in which the ratio L/D is not constant but varies in non-linear manner around the circumference of the air inlet, the zone of the air inlet that has the greatest length being connected to the pylon.

FIGS. 2 to 5 show a preferred embodiment of the invention, in which the elements described above with reference to FIG. 1 are given the same numerical references, plus one hundred.

The airplane 140 shown in FIG. 1 is fitted with two engines 110 having unducted pusher propellers, these engines being connected by pylons 134 to the rear of the airplane fuselage 141, on either side thereof.

At its upstream end, the nacelle 112 of each engine 110 includes an air inlet 113 of the invention that has an axial projection 142 for connection with the pylon 134. The pylon 134 extends substantially radial relative to the axis A of the engine, from the projection 142 of the air inlet outwards as far as the airplane fuselage 141. The projection 142 of the air inlet is thus situated beside the airplane fuselage 141. The pylon 134 is inclined at an angle α lying in the range 5° to 45°, and for example equal to about 20°, relative to a horizontal plane passing substantially through the end of the pylon 134 connected to the fuselage 141.

The projection 142 is generally triangular or trapezoidal in shape with its apex or its small base situated upstream and with its (large) base situated downstream. The downstream base of the projection 142 extends angularly around the axis A over an angle that is less than or equal to about 180°.

This projection 142 forms the air inlet zone of greatest axial length, and its length measured in the above-mentioned plane P and in a transverse plane P2' passing through the upstream end of the projection is referenced Lmax. This length Lmax is substantially equal to the length L2 of the air inlet 13' of FIG. 1, this air inlet 13' being lengthened in order to enable the pylon 34 to be incorporated with the engine.

The length Lmax serves to calculate the maximum value of the ratio L/D of the air inlet, which is equal to Lmax/D, and has a value of about 2.5, for example.

The projection 142 is connected to a substantially annular portion 144 of the air inlet that extends around the axis A, and that defines the shortest zone of the air inlet. This portion 144 is diametrically opposite the projection 142. The length of this portion 144, measured between the plane P and a transverse plane P1' passing through the downstream end of said portion, is referenced Lmin (the downstream end of the portion 144 being diametrically opposite the upstream end of the projection 142). This length Lmin is substantially equal to the length L1 of the air inlet 13 of FIG. 1, i.e. to the optimum minimum value for said air inlet, as determined independently of the pylon.

The length Lmin serves to calculate the minimum value of the ratio L/D of the air inlet, which ratio is equal to Lmin/D and has a value of about 0.9, for example.

Figure 5:
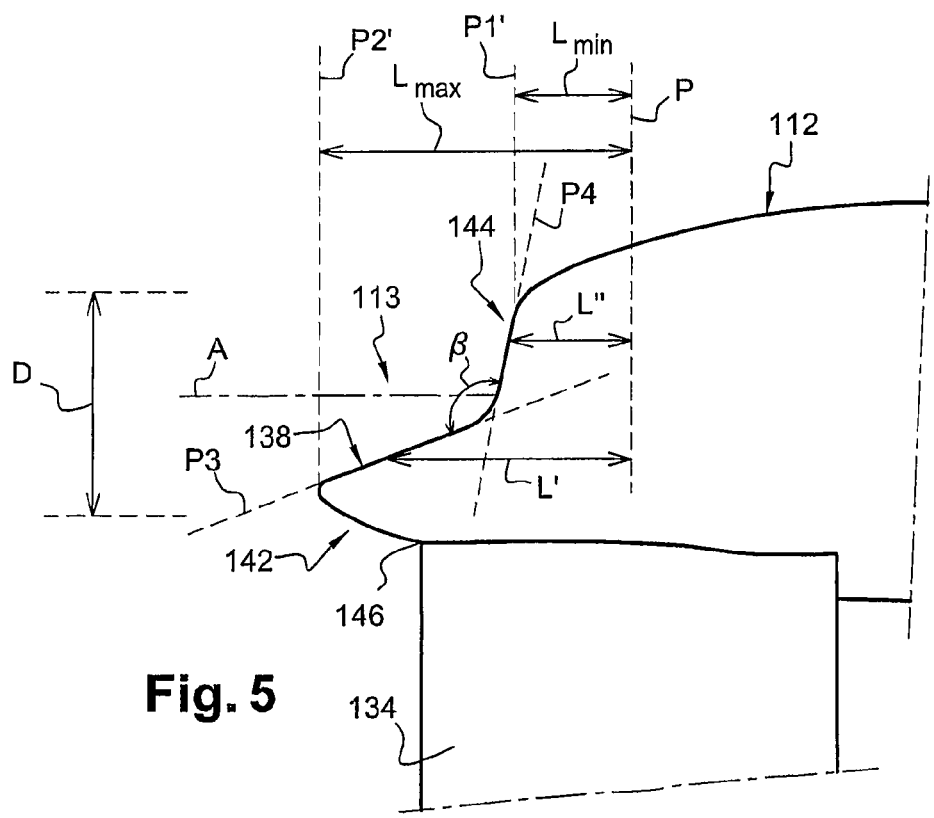
FIG. 5 is a fragmentary diagrammatic side view of the nacelle and of the pylon of FIG. 4, on a larger scale.

When the air inlet 113 is seen from the side or in a direction perpendicular to the midplane passing through the axis A of the engine and the axis of the pylon 134, as shown in FIG. 5, the leading edge 138 defines a dihedral on either side of the axis A presenting a relatively large angle β, i.e. an angle greater than 90°. This angle β is about 120° to 150° in the example shown.

The leading edge 138 of the air inlet thus defines, on either side of the midplane, a plurality of different air inlet lengths L', L", lying in the range Lmin to Lmax. These lengths make it possible to vary the ratio L/D of the air inlet all around its circumference. Unlike the prior art, the variation of this ratio is not linear (as it would be if the leading edge were to extend in a single inclined air-inlet plane), but rather it is non-linear, and for example is approximately hyperbolic or parabolic. This particular configuration of the leading edge 138 makes it possible to define at least two air inlet planes.

In the example of FIG. 5, the leading edge 138 of the air inlet defines two intersecting planes P3, P4 that are inclined relative to the axis A. The upstream first plane P3 is defined by the portion of the leading edge of the projection 142 (or the upstream sides of the above-mentioned dihedral) and is inclined at an angle lying in the range approximately 15° to 50° relative to the axis A. The downstream second plane P4 is defined by the portion of the leading edge of the air inlet portion 144 (or the downstream sides of the dihedral) and is inclined at an angle of about 70° to 90° relative to the axis A. These two planes P3, P4 intersect substantially in the junction zones between the projection 142 and the annular portion 144 of the air inlet.

As can also be seen in FIG. 5, the junction zone 146 between the air inlet 113 and the leading edge of the pylon 134 is situated in a transverse plane that extends between the transverse planes P1' and P2'.

Figure 6:
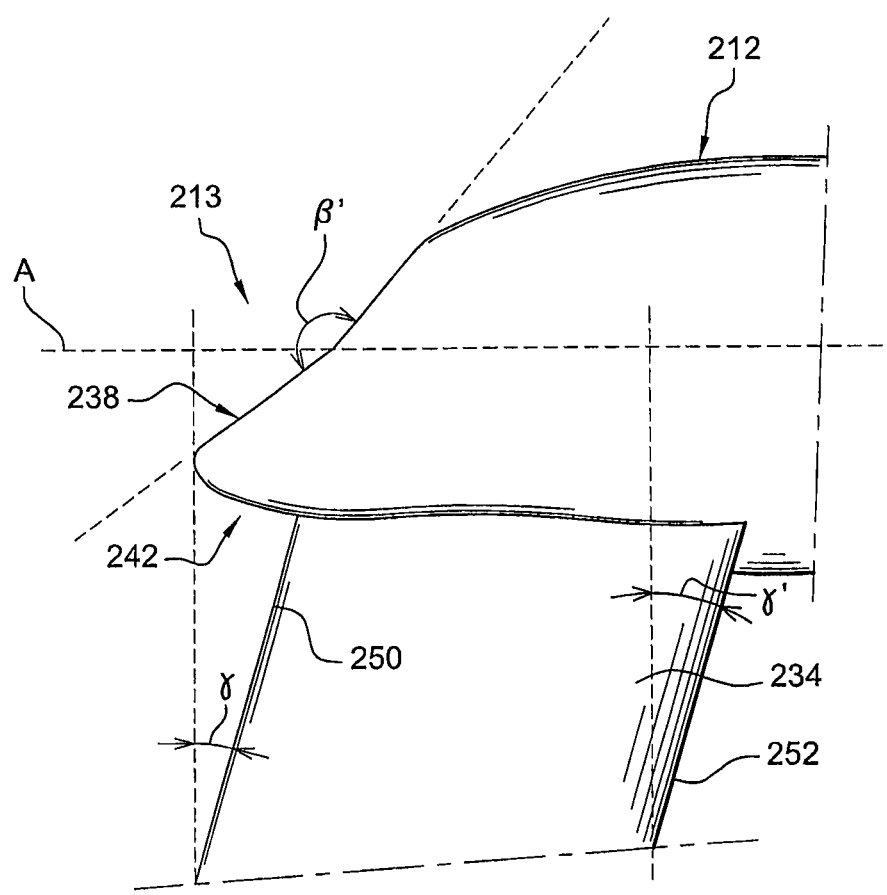
FIG. 6 is a fragmentary diagrammatic side view of another embodiment of the nacelle and of the pylon according to the invention.

In the variant shown in FIG. 6, the leading edge 238 of the air inlet 213 of the nacelle 212 having an axial projection 242 defines, on either side of the axis A, a dihedral having an angle β', e.g. lying in the range about 90° to 175°. This angle β' is about 170° in the example shown.

In the variant shown in FIG. 6, the leading edge 238 of the air inlet 213 defines, on either side of the axis A, a dihedral having an angle β', e.g. lying in the range about 90° to 175°. This angle β' is about 170° in the example shown.

In this example, the leading edge 250 of the pylon 234 is inclined relative to a plane perpendicular to the axis A of the engine, at an angle γ lying in the range approximately 10° to 35°, and is preferably 20°. The trailing edge 252 of the pylon 234 is also inclined relative to a plane perpendicular to the axis A, at an angle γ' lying in the range approximately 10° to 35°, and is preferably 20°. The values of the angles γ and γ' may be identical or different.

The pylon for connecting the engine to the airplane may also be inclined relative to a radial plane passing via the axis of the engine.

In a variant embodiment of the invention, the axial projection of the air inlet enables bulky equipment of the engine to be incorporated other than a pylon.

The invention claimed is:

1. An air inlet of an aeroengine including unducted pusher propellers, the engine being for connection via a pylon to a fuselage of an airplane,
   wherein a local length of the air inlet, measured parallel to an axis of the engine between a point of a leading edge of the air inlet and a transverse plane situated level with an upstream rotor of the compressor of the engine is longer in a zone of the air inlet that is connected to the pylon, and shorter in a zone of the air inlet opposite from the pylon.

2. An air inlet according to claim 1, wherein the ratio L/D lies in a range approximately 2.5 to 0.9 between the zone of the air inlet that is connected to the pylon and the opposite zone of the air inlet, L being the local length of the air inlet, and D being its inside diameter measured level with the upstream rotor of the engine compressor.

3. An air inlet according to claim 1, wherein in a direction perpendicular to a midplane including the axis of the pylon and the axis of the engine, the leading edge of the air inlet has an outline that is substantially in a form of a dihedral.

4. An air inlet according to claim 1, wherein the angle at the apex of the dihedral lies in a range 90° to 175°.

5. An air inlet according to claim 3, wherein the apex of the dihedral has a concave rounded shape beside an open side of the dihedral.

6. An air inlet according to claim 1, comprising an axial projection projecting upstream, the pylon configured to extend substantially radially relative to the axis of the engine from the projection.

7. An air inlet according to claim 1, wherein the air inlet is symmetrical about a plane including a midplane of the pylon containing the axis of the engine.

8. An air inlet according to claim 1, wherein the leading edge and/or the trailing edge of the pylon are/is inclined at an angle lying in a range approximately 10° to 35°, relative to a transverse plane.

9. An aeroengine including unducted pusher propellers, the aeroengine being for connection via a pylon to a fuselage of an airplane and comprising:
   an air inlet,
   wherein a local length of the air inlet, measured parallel to an axis of the engine between a point of a leading edge of the air inlet and a transverse plane situated level with an upstream rotor of the compressor of the engine is longer in a zone of the air inlet that is connected to the pylon, and shorter in a zone of the air inlet opposite from the pylon.

10. An airplane comprising at least two engines according to claim 9, the two engines connected by pylons to a rear of the fuselage of the airplane, on either side thereof.

\* \* \* \* \*

UNITED STATES PATENT AND TRADEMARK OFFICE
CERTIFICATE OF CORRECTION

| | | |
|---|---|---|
| PATENT NO. | : 8,622,340 B2 | Page 1 of 1 |
| APPLICATION NO. | : 13/128259 | |
| DATED | : January 7, 2014 | |
| INVENTOR(S) | : Stephane Emmanuel Bensilum | |

It is certified that error appears in the above-identified patent and that said Letters Patent is hereby corrected as shown below:

In the Specifications

Column 4, lines 38-49, delete the paragraph in its entirety;

Column 6, lines 15-18, delete the paragraph in its entirety; and

In the Claims

Column 6, line 56, change "claim 1" to --claim 3--.

Signed and Sealed this
Thirteenth Day of May, 2014

Michelle K. Lee
*Deputy Director of the United States Patent and Trademark Office*